US006177188B1

(12) United States Patent
Ichioka et al.

(10) Patent No.: US 6,177,188 B1
(45) Date of Patent: Jan. 23, 2001

(54) RECORDING MEDIUM AND INK JET RECORDING PROCESS USING IT

(75) Inventors: Masako Ichioka, Tokorozawa; Hitoshi Yoshino, Zama; Yuji Kondo, Machida, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/276,749

(22) Filed: Mar. 26, 1999

(30) Foreign Application Priority Data

| | | |
|---|---|---|
| Mar. 31, 1998 | (JP) | 10-087098 |
| Mar. 31, 1998 | (JP) | 10-087099 |
| Mar. 31, 1998 | (JP) | 10-087100 |
| Mar. 31, 1998 | (JP) | 10-087101 |
| Mar. 31, 1998 | (JP) | 10-087102 |
| Mar. 31, 1998 | (JP) | 10-087103 |

(51) Int. Cl.[7] .......... B32B 5/00

(52) U.S. Cl. .......... 428/342; 347/105; 428/195; 428/211; 428/331; 428/537.5

(58) Field of Search .......... 347/105; 428/195, 428/211, 340–342, 331, 537.5

(56) References Cited

U.S. PATENT DOCUMENTS 5,908,728 * 6/1999 Sakaki et al. .......... 430/126

FOREIGN PATENT DOCUMENTS 55-051583 4/1980 (JP) .

* cited by examiner

*Primary Examiner*—Bruce H. Hess
(74) *Attorney, Agent, or Firm*—Fitzpatrick, Cella, Harper & Scinto

(57) ABSTRACT

A recording medium which comprises a base paper containing a kenaf pulp and an ink receiving layer provided on at least one surface of the base paper, in which the ink receiving layer contains a pigment, the coating amount of the ink receiving layer is in the range of 1 to 10 $g/m^2$ by solid matter, a ratio W/D of an elongation in water W to a density D of the recording medium is in the range of 0.1 to 6.0.

11 Claims, No Drawings

RECORDING MEDIUM AND INK JET RECORDING PROCESS USING IT

BACKGROUND OF THE INVENTION

1. Field of the Invention

The present invention relates to a recording medium having a natural texture of kenaf paper with excellent characteristics for images, and an ink jet recording method using the recording medium in which ink droplets fly for recording.

1. Related Background Art

The ink jet recording system is a recording method for images and characters by letting minute ink droplets fly and attach to a recording medium such as paper based on various operation principles. The feature of the system includes high-speed printing, low-noise operation, easy adaptation for multi-color printing, and adaptability for various recording patterns, as well as the absence of image fixation process. Recently, the system has been widely used no only for recording images such as characters in monochrome, but also in recording full-color images. Moreover, not limited its use to business machines, this system is rapidly spreading in various fields, such as industry and art creation.

Various materials are used for the recording medium of the ink jet recording system, including not only ordinary paper made of ordinary wood pulp such as copy paper and bond paper, but also various coated sheets each having an image forming layer on its surface, transparent film formed of synthetic resin for OHP, textile of various fibers and the like. Among these, the amount of plain paper used as a recording medium has been remarkably increasing with recent popularization of personal computers, and office automation.

According to the popularization of the ink jet system, various properties are required for the recording medium, such as rapid ink-absorbency, high ink-absorbing capacity, and improved image density and printing quality on printing, as far as increased water resistance of printed matters. It is especially required for the recording medium to allow the ink jet attached to the recording medium quickly to penetrate into the medium and apparently become dry on the surface. Furthermore, since a water-base ink is usually used in the ink jet system, resulting in poor drying properties, a phenomenon called cockling may occur, i.e., the printed portion may become wavy, especially when paper made of cellulose pulp is used as the recording medium.

To solve these problems, Japanese Patent Application Laid-Open No. 55-51583 discloses that a coat layer of amorphous silica and a high-molecular binder provides the high ink absorbency for water-base ink printing, and is suitable for high-speed printing. Therefore, the application of such a coat layer as an ink-receiving layer for the ink jet recording medium seems to be effective.

Kenaf has been attracting attentions as a pulp material for paper production, a substituent for pulp wood. Kenaf pulp made from kenaf is largely classified in the total trunk pulp obtained by pulping both ligneous and bast portions, the bast pulp obtained by pulping only the bast portion, and the ligneous pulp obtained by pulping only the ligneous portion. The kenaf paper mainly made of the kenaf pulp has a texture like Japanese paper, with such properties as bulkiness, large ink-absorbing capacity, and excellent ink-receptibility.

A paper recording medium such as kenaf having an excellent ink absorbency and a large ink-absorbing capacity has a problem that feathering or printing-through occurs when the ink is applied. Furthermore, the printed portion of recording medium is disadvantageously elongated becoming wavy, i.e., so-called cockling occurs. Thus, the kenaf paper excellent in both ink absorbency and image quality properties has not been obtained yet. If an ink receiving layer is formed on a kenaf paper surface to improve the above-mentioned shortcomings, ink jet recording properties such as the ink absorbency and suitability for high-speed printing can be improved, but there is a problem that the natural texture of kenaf paper is lost, and when an ink receiving surface is white, black ink turns to brown, with poor quality of formed full-color image.

SUMMARY OF THE INVENTION

An object of the present invention is to provide a recording medium provided with an ink receiving layer on kenaf paper as a base paper without deteriorating the texture of kenaf paper, to allow the applied ink to penetrate into the medium quickly to suppress cockling or beading on the printed surface, and to provide a high-quality image with a high clarity without feathering or print-through. An ink jet recording method using the recording medium is also provided.

The present invention provides a recording medium which comprises an ink receiving layer on at least one surface of a base paper containing a kenaf pulp, wherein the ink receiving layer contains a pigment, a coating amount of the ink receiving layer is in the range of 1 to 10 $g/m^2$ by solid content, and a ratio W/D of the elongation of the sheet in water (W) to the density (D) of the recording medium is in the range of 0.1 to 6.0. There is also provided an ink jet recording method using the recording medium.

DETAILED DESCRIPTION OF THE PREFERRED EMBODIMENTS

Preferred embodiments of the present invention is described in detail.

First, the base paper for use in the present invention is described. The base paper made of kenaf pulp is not especially limited so long as it contains the pulp. Therefore, base paper solely made of the kenaf pulp may be used, or paper made of the kenaf pulp and wood pulp or another type of pulp can be used. Kenaf comprises a ligneous portion and a bast portion, and the ligneous portion is slightly different in properties from the bast portion. A ligneous pulp formed of the ligneous portion contains shorter fibers and a large lignin content, while a bast pulp made from the bast portion contains longer fibers and a small lignin content. When the ligneous and bast portions are pulped together, the pulp has intermediate properties.

In the present invention, any kenaf pulp can be used, preferably a kenaf pulp comprised of the ligneous pulp containing an appropriate amount of bast pulp in accordance with desired properties. Specifically, when a chemical ligneous pulp solely made of the kenaf ligneous portion is used, a resulting base paper is poor in air permeability, thus especially when the recording medium of the present invention is used as an ink jet recording paper, the ink absorbency easily becomes insufficient.

The base paper to be used in the present invention contains the kenaf pulp, but the content of the kenaf pulp is preferably in the range of 10 to 100 wt % in total pulp constituting the base paper, more preferably in the range of 30 to 100 wt % from the viewpoint of kenaf texture in the present invention. When the content of kenaf pulp in the base paper is less than 10 wt %, the kenaf paper undesirably lacks the texture or color shade specific to kenaf.

Examples of a pulp which can be used together with the kenaf pulp include wood pulps mainly made from Japanese red pine, black pine, silver fir, todomatsu (*Abies sachalinensis* FR. SCHMIDT), cedar or another coniferous tree, or beech, birch, pasania and another broad-leaved tree. The wood may be pulped in any method and, for example, mechanical pulp, sulfite pulp, kraft pulp, semi-chemical pulp, chemimechanical pulp, refiner ground wood pulp and the like can be used. Wastepaper pulp obtained by recycling can further be used. Moreover, in the recording medium of the present invention, in addition to the cellulose fibers, glass fiber or another inorganic fiber, or polyester fiber, aramid fiber or another synthetic fiber may appropriately be used as required. To produce the base paper used in the present invention, the above-mentioned materials may be used together with the kenaf pulp, alone or in appropriate combination thereof according to the use of the recording medium.

The base paper used in the present invention can be made using a conventional paper machine after adding to the pulp materials containing the kenaf pulp those additives including: various fillers for improving paper softness, surface smoothness, opacity, printing capacity and the like; various internal sizing agents for providing the paper with resistance to liquid such as ink; and fixing agents for fixing the sizing agent, and if necessary, paper-strengthening agents, retention aids, anti-foaming agents, conductive agents, and dyes.

The filler usable in preparing the base paper includes, for example, inorganic fillers formed of an inorganic pigment such as clay, talc, precipitated calcium carbonate light, calcined kaolin, aluminum oxide, aluminum hydroxide, titanium oxide and the like. As the internal sizing agent, a widely used rosin sizing agent can be used with sulfate band as the fixing agent. When alkyl ketene dimers, alkenyl succinic acids or other neutral sizing agents are used, cationic starch or another cationic fixing aid is used together. Furthermore, polyacrylamide polymer, starch or the like can be used as the paper-strengthening agent.

The base paper used in the present invention, in addition to the internal sizing agent, if necessary, may be subjected to surface sizing treatment by applying a surface sizing agent to a paper surface on the paper machine. In this case, the surface sizing agent includes rosins, petroleum resins, oxide starch, acetyl starch, hydroxyethyl starch or another starch and derivative thereof, polyvinyl alcohol and derivative thereof, alkyd resin, polyamide, styrene, acrylate, olefin, maleic acid, vinyl acetate or another polymer, copolymer thereof or other synthetic resins and emulsions of the synthetic resins, waxes, and the like.

The present inventors have found that the ink absorbency of kenaf paper can be improved by using the kenaf pulp-containing base paper of high ink absorbency and forming an ink receiving pigment layer on at least one surface of the paper. In this case, it is necessary to provide the ink receiving layer such that the coating amount is in the range of 1 to 10 g/m$^2$ by solid matter and the ratio W/D of recording medium (W: the elongation of the sheet in water, D: density) is in the range of 0.1 to 6.0, so that the texture of kenaf paper can be maintained, and the applied water-base ink can quickly penetrate into the paper surface, and the cockling of the printed paper surface can be suppressed, furthermore, a high-quality image can be formed without any feathering or print-through.

According to the above-mentioned constitution, when ink is applied to the recording medium of the present invention by the ink jet system, the ink quickly penetrates, all residual ink becomes dry to suppress phenomena such as staining and beading. In addition, cockling due to excessive ink penetration is prevented to provide a clear high-quality image on the recording medium without any feathering or print-through.

Furthermore, in the present invention, the elongation of the sheet in water (W) of the recording medium is preferably 3% or less, more preferably 2% or less. When the elongation of the sheet in water (W) is more than 3%, severe cockling occurs after printing, and cockles tend to graze the printer head resulting in stain on the surface of the recording medium. The elongation of the sheet in water is ideally 0%, but a lower limit of the elongation of the sheet in water is actually about 0.1%.

In the present invention, the density (D) of the recording medium is preferably adjusted in the range of 0.6 to 0.8 g/cm$^3$. Specifically, when the density (D) is less than 0.6 g/cm$^3$, too many voids are present in the recording medium, which tends to cause print-through. On the other hand, when it is more than 0.8 g/cm$^3$, the ink penetration property of the recording medium is lowered so that non-penetrated ink on the surface of the recording medium tends to cause phenomenon such as stain or beading, and clear, high-density, high-quality image cannot be obtained.

To make the ratio (W/D) of the elongation of the sheet in water (W) to the density (D) of the recording medium of the present invention in the range of 0.1 to 6.0, one can for example, control the pulp beating method or beating conditions, or adjust the tension during paper making. Specifically, it is preferable to beat pulp under the conditions that the freeness comes in the range of 150 to 600 ml, preferably 150 to 300 ml when measured by Canadian standard freeness tester of JIS P8121 (pulp freeness testing method). When the freeness is less than 150 ml, the density of obtained base paper becomes less than 0.6, so that, as described above, too many voids are present in the recording medium, and when ink is applied to form the image, the print-through will disadvantageously occur. On the other hand, when the freeness exceeds 600 ml, the density of the obtained base paper exceeds 0.8, which will cause phenomenon such as beading and high-density, high-quality images will not be obtained.

Specifically, the base paper to be used in the present invention is obtained as follows:

For example, to the pulp materials containing the kenaf pulp are added those additives including: various fillers for improving paper softness, surface smoothness, opacity, printing capacity and the like; various internal sizing agents for providing the paper with resistance to liquid such as ink; and fixing agents for fixing the sizing agent, and if necessary, paper-strengthening agents, retention aids, anti-foaming agents, conductive agents, and dyes. Subsequently, the base paper is made using a paper machine selected from Fourdrinier machine, cylinder machine, tan-ami machine and inclined wire machine.

The kenaf pulp constituting the base paper for use in the recording medium of the present invention is preferably a mixture of the ligneous and bast portions of kenaf. Also, for the recording medium of the present invention, it is preferable to use the base paper having a thickness of 50 to 250 $\mu$m, and basis weight of 50 to 250 m$^2$/g, and macerated freeness in the range of 150 to 600 ml. When the base paper for use in the present invention is prepared, conventional equipment such as a machine calender and super calender can be used as required in order to adjust its thickness and surface smoothness.

In the recording medium of the present invention, an ink receiving layer is formed on at least one surface of the base paper prepared as described above. The ink receiving layer will be described hereinafter. The ink receiving layer in the present invention contains at least a pigment, preferably a pigment and a binder. Examples of usable pigment include silica, zeolite, calcium carbonate, diatomaceous earth, kaolin clay, calcined clay, talc, aluminum hydroxide, colloidal alumina, alumina, alumina hydrate, barium sulfate, titanium dioxide, zinc oxide, zinc carbonate, magnesium silicate, magnesium carbonate, organic pigment (plastic pigment), and other pigments conventionally used in coating agents. These pigments may be used alone or as an appropriate mixture of two or more thereof in the present invention. Especially preferable pigments are alumina hydrate or silica.

It is preferable to control the average pigment particle size to 500 nm or less in the coating liquid in which pigment is dispersed, when the ink receiving layer of the recording medium is formed in the present invention by applying a coating liquid onto at least one surface of the base paper. When the average particle diameter of the pigment dispersed in the coating liquid exceeds 500 nm, the ink receiving surface tends to look too white. Since the alumina hydrate easily satisfy the conditions, it is preferably used as the pigment of the ink receiving layer in the present invention. Furthermore, alumina hydrate having BET specific surface area of 5 to 500 $m^2/g$ is preferably used. When the alumina hydrate within this range is used, the color shade and texture of kenaf are maintained. When silica is used, BET specific surface area is preferably in the range of 5 to 500 $m^2/g$.

When an alumina hydrate suitable for the present invention such as an alumina hydrate amorphous in X-ray measurement, boehmite, pseudo-boehmite, and $\gamma$-alumina is used, the coating liquid containing the alumina hydrate having an average particle diameter of 300 nm or less dispersed therein is relatively easily obtained by a known treatment agent such as acetic acid, hydrochloric acid, nitric acid, formic acid and the like.

In addition to the above advantages, alumina hydrate has positive electric charges and advantageously excellent in fixing negative charged dyes contained in the ink widely used for ink jet recording etc. Therefore, when the ink receiving layer is formed using alumina hydrate, it is possible to form images excellent in color development. Thus when an alumina hydrate is used as the pigment constituting the ink receiving layer of the recording medium of the present invention, a full-color image having a remarkably higher quality can be formed compared with the conventional recording medium.

The ink receiving layer of the recording medium of the present invention contains at least one of the aforementioned pigments, and it is preferable to also contain a binder to stably fix the pigment onto the surface of the base paper. Examples of the binder include polyvinyl alcohol, modified polyvinyl alcohol, polyacrylamide, partial saponified polyvinyl acetate, oxide starch, etherified starch, carboxymethyl cellulose, hydroxyethyl cellulose and other cellulose derivatives, casein, gelatine, soybean protein, maleic resin, and the like. These may be used alone or as a mixture of two or more thereof.

In the present invention, the coating liquid is preferably prepared by blending the binder and the pigment such as alumina hydrate, and the liquid is applied to at least one surface of the base paper containing kenaf pulp, and dried to form the ink receiving layer. In this case, a blend percentage of pigment in the coating liquid is preferably in the range of 15 to 90 wt % of total solid content of the formed ink receiving layer. Specifically, when the image is formed on the ink receiving layer at the percentage of less than 15 wt %, the fixing property of the dye in the ink easily becomes insufficient. On the other hand, when the percentage exceeds 90 wt %, powder easily falls off the ink receiving layer.

Furthermore, in the present invention, when a binder is used for the ink receiving layer, a blending rate of the binder is preferably in the range of 10 to 85 wt % of the total solid content of the ink receiving layer. Specifically, when the rate exceeds 85 wt %, the film formation by the binder lowers the ink absorbency of the ink receiving layer. On the other hand, when it is less than 10 wt %, a binding force of ink receiving layer to the base paper becomes insufficient, so that powdering may occur. However, when only alumina hydrate is used as the pigment for the ink receiving layer, since alumina hydrate applied to the surface of the base paper easily sinks therein, powdering will not occur during ordinary use while keeping the natural texture of kenaf paper. In this case, no problem will occur if the binder is not used in forming the ink receiving layer. Therefore, in the present invention the binder is not necessarily indispensable in forming the ink receiving layer.

In the coating liquid for forming the ink receiving layer, other additives may be added in addition to the aforementioned additives. Such additives include pigment dispersant, ant-foaming agent, colorant, antioxidant, ultraviolet absorbing agent, viscosity modifier, lubricant, crosslinker, and cationic compound or cationic resin which improves the water resistance of the printed matter formed using a water-base ink such as the ink jet recording ink. These additives are appropriately selected and used in accordance with manufacture conditions of recording medium, printing quality of printed matters, and other demanded performances.

As described above, the surface sizing agent may be applied if necessary, but it is not preferable in respect of penetration properties. In the recording medium of the present invention, the excessive penetration of ink into the base paper, which may occur when surface sizing treatment is not performed, can be advantageously suppressed by providing a pigment-containing ink receiving layer on the base paper.

According to the study of the present inventors, when no surface sizing agent is applied, it is preferable to form the ink receiving layer containing the pigment on at least one surface of the base paper in such a manner that Stoeckigt sizing degree of the recording medium becomes less than 30 seconds. By taking such constitution, an appropriate ink absorbency is realized, the ink quickly penetrates into the base paper, and ink dots are prevented from being spread on the paper surface.

Therefore, when no surface sizing agent is applied, the base paper must be prepared to have a minimal Stoeckigt sizing degree, e.g., 200 seconds or less, further preferably 150 seconds or less, by appropriately selecting the materials, forming method and the like.

When the Stoeckigt sizing degree of the base paper is large, the degree can be lowered, for example, by adding a surfactant to the coating liquid for forming the ink receiving layer. In this case, known surfactants such as anions, cations, and nonionics can be used.

In the recording medium of the present invention using the base paper containing the kenaf pulp, a difference $\Delta E$ of the color shade of base paper surface and that of a surface with the ink receiving layer formed thereon (hereinafter referred to as the ink receiving surface) is measured at nine points a* and nine points b* of the surfaces using a colorimeter/color difference meter. Obtained from these values are average values $a_2^*$ and $b_2^*$ of color shade of base paper surface, and average values $a_1^*$ and $b_1^*$ of color shade of ink receiving surface of the recording medium. When the difference ΔE obtained by following equation is in the range of 0 to 2.0, preferably 0 to 1.8, excellent image properties are advantageously provided, and the natural texture or color shade of the base paper or kenaf paper is not deteriorated. [Equation 1]

$$\Delta E=\sqrt{(a_1^*-a_2^*)^2+(b_1 \ldots}$$

This means, the closer the value of ΔE comes to zero, the more the tone of the ink receiving surface is similar to that of the base paper. Thus, when the tone of the ink receiving surface is different from the original color shade of the base paper due to the material of the ink receiving layer, the ink receiving surface can give the same impression in color shade as the base kenaf paper by modifying the recording medium in such a manner that the value of ΔE measured as described above becomes small, while the natural texture of kenaf paper is maintained.

To constitute the ink receiving layer to have small ΔE, it is used as the pigment an alumina hydrate which can be easily dispersed and give an average particle diameter of 500 nm or less in the dispersion state.

Furthermore, since the value of ΔE is also influenced by the coating amount of the coating liquid to form the ink receiving layer, the coating amount should be in the range of 1 to 10 $g/m^2$ by the solid content.

In the recording medium of the present invention, the ink receiving layer can be provided on one surface of the base paper or kenaf paper while a back print is provided on the other surface. Conventionally, when ink jet recording is performed on a recording medium having back side print of oil ink, the ink jet recording ink which is usually water-soluble is not fully absorbed in an area where the back side print is present, which causes density unevenness or blot of the formed image. However, when the kenaf-containing base paper is used, the back side print with oil ink would not affect the absorption or fixing of the water-base ink applied on the other surface, since the base paper is usually bulky, thick, and high in ink capacity and ink absorbency. Therefore, the same high-quality image can be formed as with the base paper of no back side print. Since the back side print can be present on the recording medium of the present invention, its front and back sides can be easily distinguished to prevent mistake. Moreover, a high-quality image can be formed even on a surface of decorative paper having various prints on the back side.

The ink receiving layer and back side print may be formed in any order. The back side printing may be performed in any method, but the offset printing method or the gravure printing method is preferable from the viewpoint of productivity and printing speed. In many cases the printing ink for offset printing is a viscous oil or non water-base ink comprised of dispersed coloring pigments and a vehicle such as liquid synthetic resins and resin-modified drying oil broadly used in many commercial printings. These offset printing inks can be used in the present invention without limitation. The gravure ink comprises pigments dispersed in a vehicle comprised of an organic solvent in which a hydrophobic resin is dissolved. Gravure printing method is also well known. The gravure ink and method can also be used in the present invention. Additionally, the printing method in the present invention is not limited to the aforementioned methods, but screen printing, flexographic printing, letter-press printing, or any other methods can be used.

The prints formed by the above-mentioned printing can be a simple marking for indicating the back side of the recording medium, various other designs, patterns, figures, or even solid prints. For the solid printing, the print layer may be formed by the gravure coater, roll coater and other various coating means which are used in forming the ink receiving layer as described later. The thickness of the formed print is arbitrary. When a printed layer is formed in this manner, the applied printing ink penetrates partially into the base kenaf paper and dries there, but would not penetrate through the entire thickness because of the bulkiness of the base paper. The penetration depth of the ink is usually 30% or less of the base paper thickness. Therefore, when the water-base ink is applied to the base paper surface, the image formation by the water-base ink is not adversely affected by the back side printing.

In the recording medium of the present invention, water-marks may be formed in the base paper. Water marks can be formed by using a wire cloth provided with patterns made of wire, bamboo or synthetic resin attached thereto, or made by filling meshes with a resin etc., as a cylinder mould of a cylinder machine or a face wire of the dandy roll of Fourdrinier machine. In the latter case, the meshes corresponding to the pattern are clogged to inhibit the passage of paper material. In the latter case, the raised portion forming the pattern pushes away fibers to thin the corresponding part of the paper layer. Thus the watermark is developed. The watermark may be formed by any other known method.

The base paper for use in the recording medium of the present invention can be made as with the ordinary wood pulp except that the kenaf pulp is used as the raw material. A preferable method is to use a paper machine selected from a Fourdrinier machine, a cylinder machine, a "tan-ami" (short wire) machine and a tilted wire machine. When the kenaf pulp is made into paper by one of these methods, the pulp dispersion is distributed on a wire cloth of a various shape, to which surface a soft and water-absorbing felt sheet is pressed to remove moisture by drainage and water absorption, followed by drying to finally form the kenaf paper.

Two surface of thus formed paper, one to which the felt was pressed (hereinafter referred to as the felt surface) and the other which was facing the wire cloth during paper making, are slightly differing from each other. Although this difference is very subtle, it is preferable to form the ink receiving layer on the felt surface, because completely round dots are formed.

Next, the method for forming the ink receiving layer is described. First, the components of the ink receiving layer are uniformly dispersed or dissolved in an aqueous medium by an ordinary method to prepare the coating liquid. As the aqueous medium, water, or a mixture of water and an organic solvent is used. It is preferable to uniformly disperse or dissolve the components into the medium by using, for example, a ball mill, attritor, sand mill, homomixer, Micro Fluidizer (manufactured by Micro Fluidex Co.), Nanomizer (manufactured by Nanomizer Co.) or other dispersing machines.

The viscosity of the coating liquid prepared as described above is preferably adjusted to be in a range of 30 cps–1000 cps, depending to the coating method, coating device, coating amount etc. chosen for applying the coating liquid to at least one surface of base paper.

In the present invention, an ink-receiving layer is provided by applying the coating liquid described above on at least one surface of the base kenaf-containing paper by using a coating device or a sizing press. Either on-machine coater or off-machine coater may be used, for example, a conventional air knife coater, die coater, blade coater, gate roll coater, bar coater, rod coater, roll coater, gravure coater, curtain coater, and the like can be used. After applied to at least one surface of the base paper, the coating liquid is dried by jetting hot air to form the ink receiving layer. The temperature and amount of the hot air can be changed in accordance with the base paper and coating liquid for use. The temperature of hot air, however, is preferably in the range of about 50° C. to 160° C. Temperature lower than 50° C. leads to longer drying period and too-high temperature tends to cause deterioration of the base paper or the coating liquid.

After the coating, calender treatment using a machine calender, super calender, soft calender etc. may be performed to smoothen and finish the surface. In the recording medium of the present invention, the ink receiving layer formed on at least one surface of the base paper as described above is preferably in the range of 1 to 10 $g/m^2$ by solid content. If the recording medium has the ink receiving layer of a coating amount of less than 1 $g/m^2$, lower print density, feathering or blot, lower image quality tend to occur. On the other hand, if the recording medium has the ink receiving layer of a coating amount exceeding 10 $g/m^2$, whiteness of the ink receiving layer surface is increased to deteriorate the natural color shade of kenaf paper. At the same time, since the surface of the base paper itself is densely coated with the components of ink receiving layer, the texture of kenaf paper is considerably spoiled. In the present invention, especially in order to hold the color shade and texture of kenaf paper, the coating amount of the ink receiving layer is preferably set to not exceed 10 $g/m^2$.

In the present invention, the ink receiving layer of the recording medium is not covering the surface of base paper containing the kenaf pulp but partially penetrating into the base paper. In the recording medium of the present invention, the base paper is impregnated with a part of the coating liquid, the boundary of the ink receiving layer and the base paper is not necessarily clear. Therefore, the color shade and texture of the ink receiving surface are substantially the same the base paper itself.

The recording medium of the present invention can be used in various recording systems, being especially effective when used in the ink jet recording system using a water base ink, where blot or feathering, low printing density and low image quality are often observed in the prior art. In this case, any ink usually used in the ink jet recording system which comprises a colorant, liquid medium and other additives can be used with the present recording medium. Examples of the colorant include direct dyes, acidic dyes, basic dyes, reactive dyes, food colorings and other water-soluble dyes. As the liquid medium, water, or aqueous media consisting of water and various water-soluble organic solvents can be used.

Examples of other recording systems which can utilize the recording medium of the present invention include the heat transfer recording system in which melted ink is transferred from a transfer medium to a recording medium by heating the transfer medium from the back side wherein the transfer medium is prepared by applying a hot-melt ink mainly formed of a hot-melt material, dye, pigment and the like to a thin substrate such as a resin film, high-density paper and synthetic paper; the solid ink jet recording system in which a hot-melt ink is heat-melted to form minute drops which are then discharged to perform recording; an ink jet recording system using an ink prepared by dissolving an oil-soluble dye in a solvent; a recording system using a photosensitive/pressure-sensitive donor sheet provided with micro-capsules containing a photo-polymerizable monomer and colorless or colored dyes or pigments.

To these recording systems is common that the ink is liquid during recording. The liquid ink penetrates or diffuses in the vertical or lateral direction of the ink receiving layer of the recording medium until it hardens, solidifies, or fixes. The recording medium for each recording system requires an absorbency appropriate for the system. Therefore, in the recording medium of the present invention, when the ink receiving layer is formed, the absorbency suitable for each recording system may be provided by appropriately selecting the pigment, binder, and the like.

Furthermore, the recording medium of the present invention can be used as a recording medium of an electrophotographic recording system widely used in photocopiers, printers and the like, in which a solid recording agent, the toner, is thermofixed instead of the liquid agent. Moreover, the present recording medium can be used as a recording medium for writing or painting writing utensils or paints or as a recording medium for printing such as wood- or copper print using special inks.

The present invention will be described hereinafter in more detail by way of examples, but is not limited to the examples. Additionally, % in the description is on the basis of weight unless otherwise mentioned.

EXAMPLE 1

First, 20% of ligneous portion and 80% of bast portion of kenaf produced in Thailand were cooked and bleached to obtain a kenaf paper raw material having a freeness of 205 ml measured by Canadian standard freeness tester of JIS P8121 (pulp freeness testing method).

To the kenaf pulp obtained as described above, were added, to the pulp weight, 5% of precipitated calcium carbonate (trade name of PC-700, manufactured by Shiraishi Kogyo Kabushiki Kaisha) as an inorganic filler, 1% of internal sizing agent (trade name of Size Pine K-903, manufactured by Arakawa Kagaku Kabushiki Kaisha), and 0.1% of retention aid (trade name of High Holder 351, manufactured by Kurita Water Industries Ltd.). Subsequently, a base paper containing 100% kenaf pulp as the pulp material and having a basis weight of 160 $g/m^2$ was prepared using a Fourdrinier machine.

Then one side of the base paper was coated with a coating liquid having following composition to 10 $g/m^2$ by dried weight and dried to form an ink receiving layer. A recording medium of the example was thus obtained. Water was used as the aqueous medium of the coating liquid. With the obtained recording medium, the elongation of the sheet in water (W) was 2.5%, and the density (D) was 0.62 $g/cm^3$, and the ratio W/D was 4.0.

| Coating liquid composition (converted to dry weight) | |
|---|---|
| Pigment: | |
| fine particle silica (Siloid, manufactured by Fuji Silysia Chemical Co., BET specific surface area of 300 $g/m^2$) | 10 parts by weight |

-continued

| Coating liquid composition (converted to dry weight) | |
|---|---|
| Cationic substance: | |
| polyarylamine hydrochloride (PAA-HC1-3L, molecular weight of 30,000, manufactured by Nitto Boseki Co., Ltd.) | 1 part by weight |
| Binder: | |
| polyvinyl alcohol (PVA117, manufactured by Kuraray Co., Ltd.) | 1 part by weight |

EXAMPLE 2

To the same kenaf pulp as used in Example 1, were added, to the pulp weight, 0.3% of internal sizing agent (AS-202, manufactured by Nihon PMC Co.), 0.07% of polyamide epichlorohydrin resin (WS-570 manufactured by Nihon PMC Co.), and 3% of inorganic filler precipitated calcium carbonate (PCX-850 manufactured by Shiraishi Kogyo Kabushiki Kaisha). Then a base paper of 100% kenaf pulp with the basis weight of 180 g/m$^2$ was produced.

Then the base paper was coated with the same coating liquid as used in Example 1 at 10 g/m$^2$ by dry weight and dried to form an ink receiving layer. Thus obtained recording medium had an elongation of the sheet in water (W) of 2.3%, and a density (D) of 0.65 g/cm$^3$, with a ratio W/D of 3.5.

EXAMPLE 3

A base paper made of 100% kenaf pulp was obtained in the same manner as in Example 1. The coating liquid of following composition was applied to one side of the base paper at 8 g/m$^2$ by dry weight and dried to form an ink receiving layer. Water was used as the aqueous medium of the coating liquid.

Thus obtained recording medium had an elongation of the sheet in water (W) of 1.6%, and a density (D) of 0.73 g/cm$^3$, with a ratio W/D of 2.2.

| Coating liquid composition (converted to dry weight) | |
|---|---|
| alumina (Aluminasol 520, manufactured by Nissan Chemical Industries, Ltd.) | 10 parts by weight |
| benzal conium chloride (G-50, manufactured by Sanyo Chemical Industries, Ltd.) | 1 part by weight |
| polyvinyl alcohol (PVA117, manufactured by Kuraray Co., Ltd.) | 1 part by weight |

EXAMPLE 4

A base paper of 100% kenaf pulp was obtained in the same manner as in Example 2. The same coating liquid as used in Example 3 was applied at 1 g/m$^2$ by dry weight and dried to form an ink receiving layer. The obtained recording medium had an elongation of the sheet in water (W) of 2.0%, and a density (D) of 0.62 g/cm$^3$, with a ratio W/D of 3.2.

EXAMPLE 5

To the same kenaf pulp as used in Example 1, following additives were added: 5% of inorganic filler precipitated calcium carbonate (PCX-850 manufactured by Shiraishi Kogyo Kabushiki Kaisha), 1% of internal-application sizing agent (AS-202 manufactured by Nihon PMC Co.), and 1% of polyamide epichlorohydrin resin (WS-570 manufactured by Nihon PMC Co.), and a base paper of 100% kenaf pulp having basis weight of 130 g/m$^2$ was produced by using a Fourdrinier machine.

Subsequently, the same coating liquid as in Example 3 was applied to one surface of the base paper at 8 g/m$^2$ by dry weight, and dried to form an ink receiving layer. Thus obtained recording medium had an elongation of the sheet in water (W) of 2.0%, and a density (D) of 0.80 g/cm$^3$, with a ratio W/D of 0.25.

EXAMPLE 6

To the same kenaf pulp as used in Example 1, following additives were added: 3% of precipitated calcium carbonate (trade name of PC-700, manufactured by Shiraishi Kogyo Kabushiki Kaisha) as an inorganic filler, 1% of internal sizing agent (trade name of Size Pine K-903, manufactured by Arakawa Kagaku Kabushiki Kaisha), and 0.1% of retention aid (trade name of High Holder 351, manufactured by Kurita Water Industries Ltd.). Subsequently, a base paper containing 100% kenaf pulp as the pulp material and having a basis weight of 200 g/m$^2$ was prepared using a Fourdrinier machine. Then the same coating liquid as in Example 1 was applied to one surface of the base paper at 10 g/m$^2$ by dry weight, and dried to form an ink receiving layer. Thus obtained recording medium had an elongation of the sheet in water (W) of 3.0%, and a density (D) of 0.56 g/cm$^3$, a ratio W/D 5.4.

Comparative Example 1

A base paper of 100% kenaf pulp was prepared in the same manner as in Example 2. The same coating liquid as used in Example 3 was applied to one surface of the base paper at 0.6 g/m$^2$ by dry weight and dried to form an ink receiving layer. Thus obtained recording medium had an elongation of the sheet in water (W) of 1.8%, and a density (D) of 0.60 g/cm$^3$, with a ratio W/D of 3.0.

Comparative Example 2

A base paper of 100% kenaf pulp was prepared in the same manner as in Example 2. The same coating liquid as used in Example 3 was applied to one surface of the base paper at 12 g/m$^2$ by dry weight and dried to form an ink receiving layer. Thus obtained recording medium had an elongation of the sheet in water (W) of 2.6%, and a density (D) of 0.68 g/cm$^3$, with a ratio W/D of 3.8.

Comparative Example 3

To the same kenaf pulp as used in Example 1, following additives were added: 7% of inorganic filler precipitated calcium carbonate (PCX-850 manufactured by Shiraishi Kogyo Kabushiki Kaisha), 1% of internal-application sizing agent (AS-202 manufactured by Nihon PMC Co.), and 1% of polyamide epichlorohydrin resin (WS-570 manufactured by Nihon PMC Co.). Subsequently, a base paper containing 100% kenaf pulp as the pulp material and having a basis weight of 100 g/m$^2$ was prepared using a Fourdrinier machine.

Subsequently, the same coating liquid as in Example 3 was applied to one surface of the base paper at 8 g/m$^2$ by dry weight and dried to form an ink receiving layer. The obtained recording medium had an elongation of the sheet in water (W) of 0.08%, and a density (D) of 0.95 g/cm$^3$, with a ratio W/D of 0.08.

Comparative Example 4

To the same kenaf pulp as used in Example 1, following additives were added: 2% of precipitated calcium carbonate (trade name of PC-700, manufactured by Shiraishi Kogyo Kabushiki Kaisha) as an inorganic filler, 0.5% of internal sizing agent (trade name of Size Pine K-903, manufactured by Arakawa Kagaku Kabushiki Kaisha), and 0.1% of retention aid (trade name of High Holder 351, manufactured by Kurita Water Industries Ltd.). Subsequently, a base paper containing 100% kenaf pulp as the pulp material and having a basis weight of 230 g/m$^2$ was prepared using a Fourdrinier machine.

Subsequently, the same coating liquid as in Example 1 was applied to one surface of the base paper at 10 g/m$^2$ by dry weight and dried to form an ink receiving layer. The obtained recording medium had an elongation of the sheet in water (W) of 3.9%, and a density (D) of 0.61 g/cm$^3$, with a ratio W/D of 6.4.

Images were formed on the recording media of Examples 1 to 6 and Comparative Examples 1 to 4 using an ink jet printer (BJC430, manufactured by Cannon Inc.), and the printed recording media were evaluated as follows:

The printed recording medium was visually observed. (circle): the texture of kenaf paper was maintained (cross): the texture was spoiled.

The ink absorbency was evaluated by touching immediately after printing. (circle): no ink smear to the hand. (cross) some ink smear.

The printed recording medium was visually observed for occurrence of blot, print-through and cockling. (circle): no occurrence of these phenomena. (cross): occurrence of these phenomena.

The printed portion was visually observed for occurrence of beading. (circle) no beading was observed. (cross) beading was observed.

The formed image was visually observed for quality. (circle): clear image. (cross): not clear image.

These evaluation results are shown in Table 1.

Furthermore, for each of the recording media, are shown in Table 1 the freeness measured based on JIS P8121, the elongation of the sheet in water (W) obtained by "Water Immersion Elongation Test Method of Paper and Plate Paper" of JAPAN TAPPI Paper Pulp Test Method No. 27, the density D measured according to JIS P8118, and the ratio W/D.

TABLE 1

| | Properties of Recording Medium | | Properties of Printed Part | | | | | Physical Properties of Recording Medium | | | |
|---|---|---|---|---|---|---|---|---|---|---|---|
| | (1) | (2) | (3) | (4) | (5) | (6) | (7) | (8) (ml) | (9) (%) | (10) (g/cm$^3$) | W/D |
| Example 1 | ○ | ○ | ○ | ○ | ○ | ○ | ○ | 272 | 2.5 | 0.62 | 4.0 |
| Example 2 | ○ | ○ | ○ | ○ | ○ | ○ | ○ | 282 | 2.3 | 0.65 | 3.5 |
| Example 3 | ○ | ○ | ○ | ○ | ○ | ○ | ○ | 243 | 1.6 | 0.73 | 2.2 |
| Example 4 | ○ | ○ | ○ | ○ | ○ | ○ | ○ | 225 | 2.0 | 0.62 | 3.2 |
| Example 5 | ○ | ○ | ○ | ○ | ○ | ○ | ○ | 572 | 0.2 | 0.80 | 0.25 |
| Example 6 | ○ | ○ | ○ | ○ | ○ | ○ | ○ | 248 | 3.0 | 0.56 | 5.4 |
| Comparative Example 1 | ○ | X | X | ○ | ○ | ○ | X | 158 | 1.8 | 0.60 | 3.0 |
| Comparative Example 2 | X | ○ | ○ | ○ | ○ | ○ | ○ | 315 | 2.6 | 0.68 | 3.8 |
| Comparative Example 3 | ○ | ○ | X | ○ | ○ | ○ | ○ | 683 | 0.08 | 0.95 | 0.08 |
| Comparative Example 4 | ○ | ○ | ○ | ○ | X | ○ | ○ | 186 | 3.9 | 0.61 | 6.4 |

(1) Texture, (2) Ink absorbency, (3) Blot, (4) Print-through, (5) Cockling (4) Beading, (5) Image clarity (6) Freeness, (7) elongation of the sheet in water (8) Density The present invention described above provides following effects:

1. The recording medium of the present invention has a texture peculiar to Kenaf paper.

2. Since the ink receiving layer is formed on at least one side of the base paper, ink is allowed to quickly penetrate into the base paper. Additionally, the generation of image blot or print-through, and the cockling of paper surface at the printed portion can be suppressed. Therefore, image clearness and beading are improved, and images of good quality can be formed.

What is claimed is:

1. A recording medium comprising a base paper containing a kenaf pulp and an ink receiving layer provided on at least one surface of the base paper, said ink receiving layer containing a pigment, a coating amount of said ink receiving layer being in a range of 1 to 10 g/m$^2$ by solid matter, a ratio W/D of an elongation of the sheet in water (W) and a density (D) of the recording medium being in a range of 0.1 to 6.0.

2. The recording medium according to claim 1 wherein the base paper contains 100% kenaf pulp by weight.

3. The recording medium according to claim 2, which contains 30 to 100% kenaf pulp by weight.

4. The recording medium according to claim 1 wherein the elongation of the sheet in water (W) is 3% or less.

5. The recording medium according to claim 4 wherein the elongation of the sheet in water (W) is 2% or less.

6. The recording medium according to claim 1 wherein the density D is in a range of 0.6 to 0.8 g/cm$^3$.

7. The recording medium according to claim 1 wherein a freeness of the recording medium is in a range of 150 to 600 ml.

8. The recording medium according to claim 1 wherein the pigment is alumina hydrate or silica having BET specific surface area in a range of 5 to 500 m$^2$/g.

9. The recording medium according to claim 1 wherein the ink receiving layer contains a cationic substance.

10. The recording medium according to claim 1 wherein a basis weight of the base paper is in a range of 50 to 250 $g/m^2$.

11. A method for recording on the recording medium of claim 1 by an ink jet method.

* * * * *

UNITED STATES PATENT AND TRADEMARK OFFICE
CERTIFICATE OF CORRECTION

PATENT NO. : 6,177,188 B1
DATED : January 23, 2001
INVENTOR(S) : Masako Ichioka et al.

It is certified that error appears in the above-identified patent and that said Letters Patent is hereby corrected as shown below:

Column 1,
Line 20, "no" should read -- not --.
Line 57, "attentions" should read -- attention --.

Column 2,
Line 38, "is" should read -- are --.

Column 5,
Line 25, "satisfy" should read -- satisfies --.
Line 41, "and" should read -- and is --.

Column 6,
Line 28, "ant-foaming" should read -- anti-foaming --.

Column 7,
Line 13,

" $\Delta E = \sqrt{(a_1 * -a_2^{*y+(b)}}$ "

should read -- $\Delta E = \sqrt{(a_1^* - a_2^*)^2 + (b_1^* - b_2^*)^2}$ --.

Line 25, "it" should be deleted.
Line 26, "is used as the pigment an alumina hydrate" should read -- an alumina hydrate is used as the pigment --.

Column 8,
Line 38, "a" (second occurrence) should be deleted.
Line 39, "shape," should read -- shapes --.
Line 43, "surface" should read -- surfaces --.
Line 63, "to" should read -- on --.

Column 9,
Line 6, "After" should read -- After being --.
Line 43, "same" should read -- same as --.

UNITED STATES PATENT AND TRADEMARK OFFICE

CERTIFICATE OF CORRECTION

PATENT NO. : 6,177,188 B1 
DATED : January 23, 2001
INVENTOR(S) : Masako Ichioka et al.

It is certified that error appears in the above-identified patent and that said Letters Patent is hereby corrected as shown below:

<u>Column 13,</u>
Line 63, "(circle)" should read -- (circle): --; and "(cross)" should read -- (cross): --.

<u>Column 14,</u>
Table 1, "Cockling (4) Beading, (5)" should read -- Cockling, (6) Beading, (7) --.
Table 1, "clarity (6) Freeness, (7) elongation of the sheet in water (8)" should read -- clarity, (8) Freeness, (9) Elongation of the sheet in water, (10) --.

Signed and Sealed this

Eighth Day of October, 2002

*Attest:*

JAMES E. ROGAN

*Attesting Officer* *Director of the United States Patent and Trademark Office*